(12) United States Patent
Nonaka

(10) Patent No.: US 9,390,709 B2
(45) Date of Patent: Jul. 12, 2016

(54) VOICE RECOGNITION DEVICE AND METHOD, AND SEMICONDUCTOR INTEGRATED CIRCUIT DEVICE

(71) Applicant: SEIKO EPSON CORPORATION, Tokyo (JP)

(72) Inventor: Tsutomu Nonaka, Hino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/032,906

(22) Filed: Sep. 20, 2013

(65) Prior Publication Data

US 2014/0088960 A1 Mar. 27, 2014

(30) Foreign Application Priority Data

Sep. 25, 2012 (JP) ................................. 2012-210456

(51) Int. Cl.
| | | |
|---|---|---|
| *G10L 15/187* | (2013.01) | |
| *G10L 13/08* | (2013.01) | |
| *G10L 15/02* | (2006.01) | |
| *G10L 15/10* | (2006.01) | |

(52) U.S. Cl.
CPC ................. *G10L 15/02* (2013.01); *G10L 15/10* (2013.01); *G10L 2015/025* (2013.01)

(58) Field of Classification Search
CPC .......... G10L 15/02; G10L 15/22; G10L 15/26
See application file for complete search history.

(56) References Cited

U.S. PATENT DOCUMENTS

| | | | |
|---|---|---|---|
| 4,908,864 A * | 3/1990 | Togawa et al. ................. 704/249 |
| 4,912,766 A | 3/1990 | Forse | |
| 6,594,347 B1 * | 7/2003 | Calder ................. H04M 3/493 | |
| | | | 379/88.01 |
| 6,772,117 B1 | 8/2004 | Laurila et al. | |
| 7,139,706 B2 * | 11/2006 | Yuschik ......................... 704/243 |
| 7,966,183 B1 * | 6/2011 | Yao et al. ........................ 704/251 |
| 2004/0234065 A1 * | 11/2004 | Anderson ........... H04M 3/5158 |
| | | | 379/266.07 |
| 2008/0109305 A1 * | 5/2008 | Hengel .................. G06Q 10/04 |
| | | | 705/14.41 |
| 2008/0235021 A1 * | 9/2008 | Cross et al. .................... 704/257 |
| 2010/0250257 A1 * | 9/2010 | Hirose .................. G10L 13/033 |
| | | | 704/278 |

FOREIGN PATENT DOCUMENTS

| | | |
|---|---|---|
| JP | A-06-077894 | 3/1994 |
| JP | A-10-288996 | 10/1998 |
| JP | A-2001-356790 | 12/2001 |

(Continued)

*Primary Examiner* — Richemond Dorvil
*Assistant Examiner* — Bryan Blankenagel
(74) *Attorney, Agent, or Firm* — Oliff PLC

(57) ABSTRACT

A semiconductor integrated circuit device for voice recognition includes: a signal processing unit which generates a feature pattern representing a state of distribution of frequency components of an input voice signal; a voice recognition database storage unit which stores a voice recognition database including a standard pattern representing a state of distribution of frequency components of plural phonemes; a conversion list storage unit which stores a conversion list including plural words or sentences to be conversion candidates; a standard pattern extraction unit which extracts a standard pattern corresponding to character data representing the first syllable of each word or sentence included in the conversion list, from the voice recognition database; and a matching detection unit which compares the feature pattern generated from the first syllable of the voice signal with the extracted standard pattern and thus detects the matching of the syllable.

8 Claims, 3 Drawing Sheets

(56) References Cited

FOREIGN PATENT DOCUMENTS

| JP | A-2004-163448 | 6/2004 |
| JP | A-2005-070367 | 3/2005 |
| JP | A-2005-070377 | 3/2005 |
| JP | A-2011-039902 | 2/2011 |

* cited by examiner

CONVERSION LIST A

| NUMBER | JAPANESE CHARACTERS | ROMAN LETTERS |
|---|---|---|
| 0011 | そば | soba |
| 0012 | うどん | udon |
| 0013 | カレー | kareh |
| ⋮ | ⋮ | ⋮ |

FIG. 3

CONVERSION LIST B

| NUMBER | JAPANESE CHARACTERS | ROMAN LETTERS |
|---|---|---|
| 0021 | 1つ | hitotu |
| 0022 | 2つ | futatu |
| 0023 | 3つ | mittu |
| ⋮ | ⋮ | ⋮ |

FIG. 4

VOICE RECOGNITION DEVICE AND METHOD, AND SEMICONDUCTOR INTEGRATED CIRCUIT DEVICE

CROSS-REFERENCE TO RELATED APPLICATIONS

This application claims priority to Japanese Patent Application No. 2012-210456 filed on Sep. 25, 2012. The entire disclosure of Japanese Patent Application No. 2012-210456 is hereby incorporated herein by reference.

BACKGROUND

1. Technical Field

The present invention relates to a voice recognition device and a voice recognition method for recognizing voice and carrying out a response or processing corresponding to the result of the recognition, in an electronic apparatus such as a vending machine, portable terminal, or navigation system. The invention also relates to a semiconductor integrated circuit device used in such a voice recognition device.

2. Related Art

Voice recognition is a technology in which an inputted voice signal is analyzed and a feature pattern obtained as a result of the analysis is collated with standard patterns (also referred to as "template") prepared in a voice recognition database based on a pre-recorded voice signal, thus providing a result of recognition. However, if the range of collation is not limited, there are a vast number of combinations of feature patterns and standard patterns to be compared, resulting in a fall in recognition rate.

As a related-art technique, JP-A-2011-33902 (paragraphs 0006 to 0007) discloses a portable electronic apparatus aimed at efficiently updating a recognition dictionary. This potable electronic apparatus includes: a Japanese phonetic syllabary character storage unit storing Japanese phonetic syllabary character-corresponding data in which predetermined processing and editable Japanese phonetic syllabary characters correspond to each other; a recognition dictionary storage unit which stores a recognition dictionary including choices of Japanese phonetic syllabary characters to be collated with the result of voice recognition, in association with the Japanese phonetic syllabary character-corresponding data; an execution unit which executes predetermined processing corresponding to the Japanese phonetic syllabary characters collated with the result of voice recognition; an update data storage unit which stores update data indicating a difference in Japanese phonetic syllabary characters between the Japanese phonetic syllabary character-corresponding data and the recognition dictionary; and an update unit which, when the Japanese phonetic syllabary character-corresponding data is updated, stores update data indicating the content of the update in the update data storage unit and updates the recognition dictionary based on the update data in predetermined timing. When the Japanese phonetic syllabary character-corresponding data is updated plural times before the recognition dictionary is updated, the update unit optimizes a difference for updating the recognition dictionary to the last Japanese phonetic syllabary character that is updated with respect to the predetermined processing, to one update data and stores the update data.

Meanwhile, JP-A-2005-70377 (paragraphs 0013 to 0014) discloses a voice recognition device aimed at discriminating and recognizing an unexpected sound in the way humans do without increasing the volume of processing. In this voice recognition device, a time window with a predetermined length is set in a predetermined cycle with respect to analysis target voice, and using this time window as a unit of processing, a feature amount including a frequency axis feature parameter related to the frequency of the voice and a power feature parameter related to the amplitude of the voice is extracted. Based on the extracted feature amount, the analysis target voice is recognized. In extracting the feature amount, the length of the time window for extracting the power feature parameter alone is made shorter than the length of the time window for extracting the frequency axis feature parameter alone.

These related-art techniques are common in that the techniques are aimed at efficient data processing in voice recognition. However, when a feature pattern obtained by analyzing an inputted voice signal is collated with standard patterns in the voice recognition database, there are still a vast number of combinations of patterns to be compared and therefore the recognition rate in voice recognition cannot be expected to improve.

SUMMARY

An advantage of some aspects of the invention is that the number of combinations of patterns to be compared in voice recognition is significantly reduced, thus improving the recognition rate.

According to some aspects of the invention, a semiconductor integrated circuit device includes: a signal processing unit which performs Fourier transform on an inputted voice signal, thus extracts frequency components of the voice signal, and generates a feature pattern representing a state of distribution of the frequency components of the voice signal; a voice recognition database storage unit which stores a voice recognition database including a standard pattern representing a state of distribution of frequency components of plural phonemes used in a predetermined language; a conversion list storage unit which stores a conversion list expressed by character data and including plural words or sentences to be conversion candidates; a standard pattern extraction unit which extracts a standard pattern corresponding to character data representing the first syllable of each word or sentence included in the conversion list, from the voice recognition database; and a matching detection unit which compares the feature pattern generated from the first syllable of the voice signal with the standard pattern extracted by the standard pattern extraction unit, thus detects the matching of the syllable, and outputs information specifying a word or sentence that has the matching-detected syllable as the first syllable thereof.

According to the above configuration, standard patterns to be compared with the feature pattern of the inputted voice signal can be narrowed down to standard patterns corresponding to character data representing the first syllable of each word or sentence included in the conversion list. As a result, the number of combinations of patterns to be compared in voice recognition can be significantly reduced and the recognition rate can be improved.

According to a first aspect of the invention, the conversion list may include plural words or sentences having different first syllables from each other. In this case, voice recognition can be done simply by comparing the feature pattern generated from the first syllable of the inputted voice signal with a standard pattern corresponding to the first syllable of each word or sentence expressed by the character data included in the conversion list.

According to a second aspect of the invention, if the conversion list includes plural words or sentences having the matching-detected syllable as the first syllable thereof, the matching detection unit may expand a range of syllables to be detected for matching. In this case, a conversion list including plural words or sentences having the same first syllable can be used.

According to a third aspect of the invention, the semiconductor integrated circuit device may further include a voice signal synthesis unit which synthesizes an output voice signal based on response data. The matching detection unit may compare a feature pattern generated from the first syllable of a voice signal inputted within a predetermined period after a voice based on the output voice signal synthesized by the voice signal synthesis unit is outputted, with the standard pattern extracted from the voice recognition database. Thus, a circumstance where a user's response within a predetermined period is expected to be one of several words or sentences can be created.

In this case, it is desirable that the conversion list is associated with the response data. Thus, a conversion list that includes character data representing a word or sentence corresponding to a question or message generated on the basis of the response data can be used for voice recognition.

According to one aspect of the invention, a voice recognition device includes: the semiconductor integrated circuit device according to the third aspect of the invention; and a control unit which selects one response content from plural response contents according to the result of voice recognition by the semiconductor integrated circuit device, supplies the response data representing the selected response content to the voice signal synthesis unit, and supplies the conversion list corresponding to the selected response content to the conversion list storage unit. Thus, an appropriate response content can be selected.

According to one aspect of the invention, a voice recognition method includes: (a) storing a conversion list expressed by character data and including plural words or sentences to be conversion candidates; (b) extracting a standard pattern corresponding to character data expressing the first syllable of each word or sentence included in the conversion list from a voice recognition database including a standard pattern indicating a state of distribution of frequency components of plural phonemes used in a predetermined language; (c) performing Fourier transform on an inputted voice signal, thus extracting frequency components of the voice signal, and generating a feature pattern indicating a state of distribution of the frequency components of the voice signal; and (d) comparing the feature pattern generated from the first syllable of the voice signal with the extracted standard pattern, thus detecting the matching of the syllable, and outputting information that specifies a word or sentence having the matching-detected syllable as the first syllable thereof.

According to such a voice recognition method, standard patterns to be compared with the feature pattern of the inputted voice signal can be narrowed down to standard patterns corresponding to character data representing the first syllable of each word or sentence included in the conversion list. As a result, the number of combinations of patterns to be compared in voice recognition can be significantly reduced and the recognition rate can be improved.

BRIEF DESCRIPTION OF THE DRAWINGS

The invention will be described with reference to the accompanying drawings, wherein like numbers reference like elements.

FIG. 3 shows a conversion list A including plural food item names shown in a food item menu.

FIG. 4 shows a conversion list B including plural responses to a question.

DESCRIPTION OF EXEMPLARY EMBODIMENTS

Hereinafter, embodiments of the invention will be described in detail with reference to the drawings.

Figure 1:
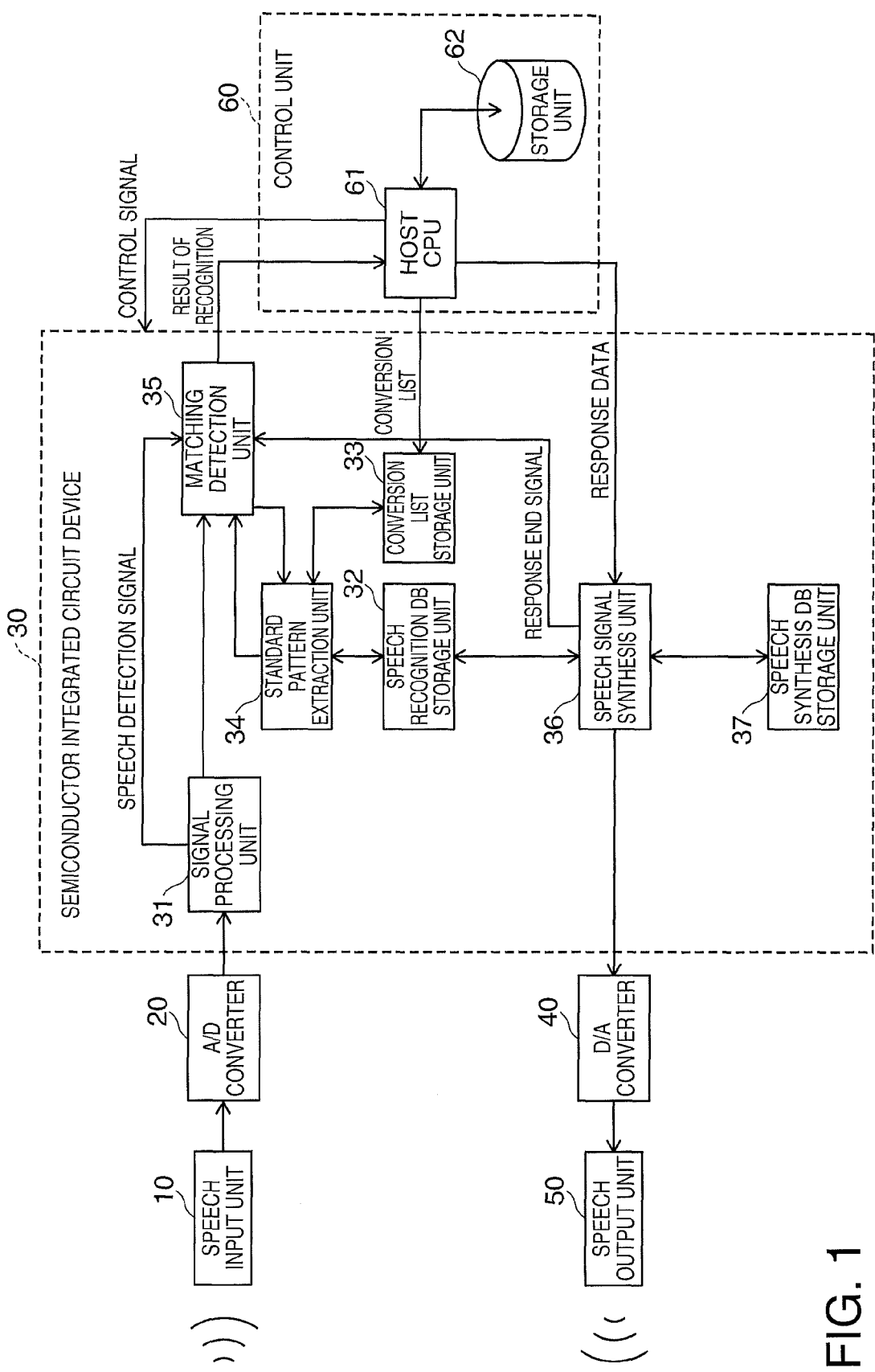
FIG. 1 shows an example of configuration of a voice recognition device according to each embodiment of the invention.

FIG. 1 shows an example of configuration of a voice recognition device according to each embodiment of the invention. This voice recognition device is installed in an electronic apparatus, for example, a vending machine, portable terminal, navigation system or the like, and recognizes voice and carries out response and processing corresponding to the result of the recognition.

As shown in FIG. 1, the voice recognition device includes a voice input unit 10, an A/D converter 20, a semiconductor integrated circuit device 30 for voice recognition, a D/A converter 40, a voice output unit 50, and a control unit 60. The control unit 60 includes a host CPU (central processing unit) 61 and a storage unit 62. The voice input unit 10, the A/D converter 20, the D/A converter 40 or the voice output unit 50 may be provided inside the semiconductor integrated circuit device 30.

The voice input unit 10 includes a microphone which converts voice into an electrical signal (voice signal), an amplifier which amplifies the voice signal outputted from the microphone, and a low-pass filter which limits the band of the amplified voice signal. The A/D converter 20 samples the analog voice signal outputted from the voice input unit 10 and thus converts the analog voice signal into a digital voice signal (voice data). For example, the voice frequency band of the voice data is 12 kHz and the number of bits is 16.

The semiconductor integrated circuit device 30 includes a signal processing unit 31, a voice recognition DB (database) storage unit 32, a conversion list storage unit 33, a standard pattern extraction unit 34, and a matching detection unit 35. The semiconductor integrated circuit device 30 may further include a voice signal synthesis unit 36 and a voice synthesis DB (database) storage unit 37.

The signal processing unit 31 performs Fourier transform on the inputted voice signal, thus extracts plural frequency components, and generates a feature pattern representing the state of distribution of these frequency components. When the level of the inputted voice signal exceeds a predetermined value, the signal processing unit 31 activates and outputs a voice detection signal to the matching detection unit 35.

Now, an example of a technique for finding the feature pattern from the voice signal will be described. The signal processing unit 31 performs filtering on the inputted voice signal and thus highlights high-frequency components. Next, the signal processing unit 31 applies a Hamming window to the voice waveform expressed by the voice signal, thus divides the time-series voice signal every predetermined time, and creates plural frames. Moreover, the signal processing unit 31 performs Fourier transform on each frame of the voice signal and thus extracts plural frequency components. Since each frequency component is a complex number, the signal processing unit 31 finds the absolute value of each frequency component.

The signal processing unit 31 applies a window of frequency range defined on the basis of the Mel scale to these frequency components and integrates the results of the windowing, and thus finds the numeric value of a number corresponding to the number of windows. Moreover, the signal processing unit 31 takes logarithms of these numeric values and perform discrete cosine transform on the logarithmic values. Therefore, if the number of windows of frequency range is 20, numeric values are provided.

Of the numeric values thus provided, low-order numeric values (for example, 12 numeric values) are called MFCCs (Mel-frequency cepstrum coefficients). The signal processing unit 31 calculates an MFCC for each frame, then connects the MFCCs according to an HMM (hidden Markov model), and finds a feature pattern as MFCCs corresponding to each phoneme included in the voice signal inputted in time series.

Here, the term "phoneme" means an element of sound that is regarded as the same in a language. Hereinafter, an example using Japanese as a language will be described. Japanese phonemes include vowels "a", "i", "u", "e" and "o", consonants "k", "s", "t", "n" and the like, semivowels "j" and "w", and special morae "N", "Q" and "H".

The voice recognition database storage unit 32 stores a voice recognition database containing a standard pattern representing the state of distribution of frequency components with respect to various phonemes used in a predetermined language. A standard pattern is prepared in advance, using voices spoken by a number of speakers (for example, approximately 200 people).

In preparing a standard pattern, MFCCs are found from a voice signal expressing each phoneme. However, MFCCs prepared with voices spoken by a number of speakers have varying numeric values. Therefore, a standard pattern with respect to each phoneme has an expanse including variations in a multidimensional space (for example, 12-dimensional space). If the feature pattern generated from the voice signal inputted to the signal processing unit 31 falls within the range of the expanse of the standard pattern, both phonemes are recognized as matching.

Meanwhile, plural voice recognition databases may be used, instead of one voice recognition database. For example, the voice recognition database storage unit 32 may store plural voice recognition databases generated on the basis of voice signals obtained by recording voices by plural groups of speakers of different ages and genders. In this case, the matching detection unit 35 can selectively use a voice recognition database with which the matching of phonemes can be detected satisfactorily, from among the plural voice recognition databases.

Alternatively, if the age and gender of the user using the voice recognition device can be specified, the voice recognition database storage unit 32 may store plural voice recognition databases generated on the basis of voice data obtained by recording voices by plural groups of speakers of different ages and genders, in association with information that specifies age and gender. In this case, the matching detection unit 35 can selectively use a voice recognition database according to the information that specifies the age and gender of the user using the voice recognition device, from among the plural voice recognition databases stored in the voice recognition database storage unit 32.

The conversion list storage unit 33 stores a conversion list containing character data expressing plural words or sentences to be conversion candidates. As the conversion list storage unit 33 stores a new conversion list, the standard pattern extraction unit 34 extracts a standard pattern corresponding to the first syllable of each word or sentence expressed by the character data contained in the conversion list, from the voice recognition database.

Here, the term "syllable" means a unit of pronunciation having one vowel as a main sound with or without one or plural surrounding consonants. Meanwhile, semivowels and special morae can form syllables. That is, one syllable is formed by one or plural phonemes. Japanese syllables include "a", "i", "u", "e", "o", "ka", "ki", "ku", "ke", "ko" and the like.

For example, a standard pattern corresponding to the syllable "a" refers to a standard pattern about the phoneme "a" forming the syllable "a". Also, a standard pattern corresponding to the syllable "ka" refers to a standard pattern about the first phoneme "k" forming the syllable "ka" and a standard pattern about the second phoneme "a" forming the syllable "ka".

The matching detection unit 35 operates when a voice detection signal or a response end signal is activated. The matching detection unit 35 compares a feature pattern generated from the first syllable of an inputted voice signal with a standard pattern extracted from the voice recognition database and thus detects the matching of the syllable.

Here, if the first syllable of the inputted voice signal is formed by one phoneme and the matching of the phoneme is detected, it means that the matching of the syllable is detected. Meanwhile, if the first syllable of the inputted voice signal is formed by plural phonemes and the matching of these phonemes is detected, it means that the matching of the syllable is detected.

Moreover, the matching detection unit 35 outputs information that specifies a word or sentence having the matching-detected syllable as the first syllable thereof, for example, character data representing the word or sentence, to the host CPU 61 as the result of the recognition. Thus, the host CPU 61 can recognize a word or sentence corresponding at least to a part of the inputted voice signal.

When response data representing a response content (question or message) is supplied from the host CPU 61, the voice signal synthesis unit 36 synthesizes a voice signal based on the response data. In order to synthesize a voice signal, the voice synthesis database stored in the voice synthesis database storage unit 37 may be used. However, it is also possible to synthesize a voice signal, using the voice recognition database stored in the voice recognition database storage unit 32.

In this case, for example, the voice signal synthesis unit 36 finds a frequency spectrum based on the standard pattern included in the voice recognition database, with respect to each phoneme included in the response content. The voice signal synthesis unit 36 also performs inverse Fourier transform on the frequency spectrum to find a voice waveform, and connects plural voice waveforms with respect to plural phonemes included in the response content, thus synthesizing a voice signal corresponding to the response content.

The D/A converter 40 converts the digital voice signal (voice data) outputted from the voice signal synthesis unit 36 into an analog voice signal. The voice output unit 50 includes a power amplifier which amplifies the power of the analog voice signal outputted from the D/A converter 40, and a speaker which outputs a voice according to the voice signal that is power-amplified.

After synthesizing the voice signal corresponding to the response content represented by the response data supplied from the host CPU 61 and outputting the synthesized voice signal to the D/A converter 40, the voice signal synthesis unit 36 activates a response end signal only for a predetermined period after the lapse of a period corresponding to the length of the response content. Therefore, the matching detection unit 35 compares a feature pattern generated from the first syllable of a voice signal inputted within a predetermined period following the output of the voice based on the voice signal synthesized by the voice signal synthesis unit 36, with a standard pattern extracted from the voice recognition database.

Thus, a circumstance where a user's response given within a predetermined period to a question or message is expected to be one of several words or sentences, can be created. Moreover, since conversion lists are associated with questions or messages, a conversion list containing character data representing a word or sentence corresponding to the question or message issued on the basis of the response data can be used for voice recognition.

The host CPU 61 operates based on software (voice recognition program) recorded in a recording medium in the storage unit 62. As the recording medium, a hard disk, flexible disk, MO, MT, CD-ROM, or DVD-ROM or the like can be used.

The host CPU 61 can supply a control signal to the semiconductor integrated circuit device 30 and thus control the voice recognition operation in the semiconductor integrated circuit device 30. The host CPU 61 also may select a response content from plural response contents according to the result of voice recognition by the semiconductor integrated circuit device 30, then supply response data representing the selected response content to the voice signal synthesis unit 36, and supply a conversion list corresponding to the selected response content to the conversion list storage unit 33. Thus, an appropriate response content can be selected.

According to each embodiment of the invention, by using a conversion list corresponding to a voice recognition scenario, standard patterns to be compared with the feature pattern of an inputted voice signal can be narrowed down to standard patterns corresponding to the first syllable of a word or sentence contained in the conversion list. As a result, the number of combinations of patterns to be compared in voice recognition can be significantly reduced and the recognition rate can be improved. Here, a voice recognition scenario refers to creating a circumstance where a user's response to a question or message is expected to be one of several words or sentences and thus carrying out voice recognition.

Figure 2:
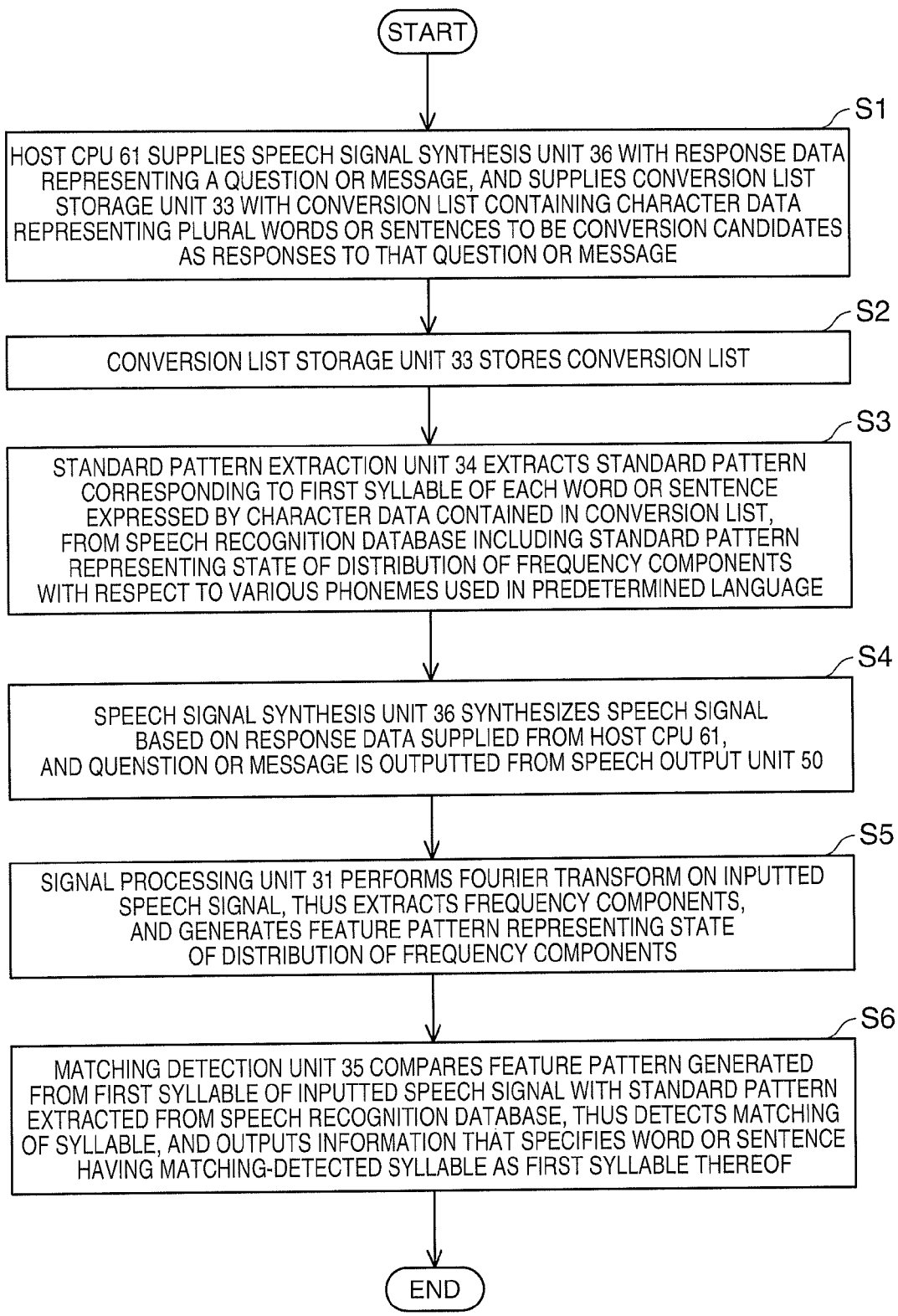
FIG. 2 is a flowchart showing a voice recognition method carried out by the voice recognition device shown in FIG. 1.

Next, a voice recognition method according to each embodiment of the invention will be described with reference to FIGS. 1 and 2. FIG. 2 is a flowchart showing a voice recognition method carried out by the voice recognition device shown in FIG. 1.

In step S1 of FIG. 2, the host CPU 61 supplies response data representing a question or message to the voice signal synthesis unit 36, and supplies the conversion list storage unit 33 with a conversion list containing character data representing plural words or sentences to be conversion candidates as responses to the question or message.

In step S2, the conversion list storage unit 33 stores the conversion list containing character data representing plural words or sentences to be conversion candidates. When a new conversion list is stored in the conversion list storage unit 33, the standard pattern extraction unit 34 in step S3 extracts a standard pattern corresponding to the first syllable of each word or sentence expressed by the character data contained in the conversion list, from a voice recognition database including a standard pattern representing the state of distribution of frequency components with respect to various phonemes used in a predetermined language.

In step S4, the voice signal synthesis unit 36 synthesizes a voice signal based on the response data supplied from the host CPU 61, and a question or message is outputted from the voice output unit 50. When the user speaks in response to the question or message, the signal processing unit 31 in step S5 performs Fourier transform on the inputted voice signal, thus extracts frequency components, and generates a feature pattern representing the state of distribution of the frequency components.

In step S6, the matching detection unit 35 compares the feature pattern generated from the first syllable of the inputted voice signal with the standard pattern extracted from the voice recognition database, thus detects the matching of the syllable, and outputs information that specifies a word or sentence having the matching-detected syllable as the first syllable thereof.

If the matching of the syllable cannot be detected, the matching detection unit 35 outputs a detection inability signal to the host CPU 61. Therefore, the host CPU 61 supplies response data representing a message "Please repeat what you said" or the like to the voice signal synthesis unit 36. Alternatively, the host CPU 61 may supply the voice signal synthesis unit 36 with response data representing a rephrased question to make it easier to be understood. The voice signal synthesis unit 36 synthesizes a voice signal based on the response data supplied from the host CPU 61, and a new message or question is outputted from the voice output unit 50.

Next, a first embodiment of the invention will be described. In the first embodiment of the invention, the conversion list storage unit 33 stores a conversion list containing character data representing plural words or sentences having different first syllables from each other. As a specific example, the case where the voice recognition device according to the first embodiment is applied to a meal ticket vending machine in a cafeteria will be described.

On the vending machine, a food item menu including plural food item names having different first syllables from each other is displayed. It is assumed that the food item menu shows characters such as "soba" (buckwheat noodles), "udon" (white wheat noodles), and "kareh" (curry). In this case, the first word to be spoken by the user is expected to be one of the "soba", "udon", "kareh" and the like shown in the food item menu.

Thus, the host CPU 61 supplies the voice signal synthesis unit 36 with response data representing a question or message "Which food item would you like? Say the food item name." The host CPU 61 also supplies the conversion list storage unit 33 with conversion list A (see FIG. 3) containing character data representing the plural food item names shown in the food item menu. In FIG. 3, numbers corresponding to food items, Japanese characters, and Roman letters are shown. However, it suffices that the conversion list contains at least Roman characters or Japanese phonetic syllabary characters that can specify the pronunciation of food item names.

When the conversion list storage unit 33 stores the conversion list A, the standard pattern extraction unit 34 extracts, from the voice recognition database, a standard pattern corresponding to each of the phonemes "s•o", "u", "k•a" and the like included in the first syllables "so", "u", "ka" and the like of the food item names "soba", "udon", "kareh" and the like expressed by the character data contained in the conversion list A. In this extraction, if the first phoneme of the food item name is a consonant, a standard pattern of the subsequent vowel is extracted, too.

Meanwhile, the voice signal synthesis unit 36 synthesizes a voice signal based on the response data supplied from the host CPU 61, and outputs the voice signal to the D/A converter 40. The D/A converter 40 converts the digital voice signal into an analog voice signal and outputs the analog voice signal to the voice output unit 50. Thus, the question or message "Which food item would you like? Say the food item name." is outputted to the user from the voice output unit 50. The voice signal synthesis unit 36 also activates a response end signal and outputs the response end signal to the matching detection unit 35. Therefore, the matching detection unit 35 starts the voice recognition operation.

If the user sees the food item menu that is displayed and says "Soba o kudasai" (I' d like soba) in response to the question or message outputted from the voice output unit 50, the signal processing unit 31 generates a feature pattern representing the state of distribution of frequency components with respect to each of the phonemes "s•o•b•a . . . ".

The matching detection unit 35 compares the feature pattern of the first phoneme "s" of the first syllable generated by the signal processing unit 31 and the standard pattern of the first phoneme "s", "u", "k" or the like of the first syllable extracted from the voice recognition database, and thus detects the matching of the phoneme "s".

If the matching-detected phoneme is a consonant, the matching detection unit 35 further compares the feature pattern of the second phoneme "o" of the first syllable generated by the signal processing unit 31 and the standard pattern of the second phoneme "o", "a" or the like of the first syllable extracted from the voice recognition database, and thus detects the matching of the phoneme "o".

The matching of the syllable "so" is thus detected. The matching detection unit 35 outputs information that specifies the food item name "soba" having the matching-detected syllable "so" as the first syllable thereof, as the result of recognition to the host CPU 61. The information that specifies the food item name "soba" may be the number in FIG. 3, the Japanese characters for "soba" or a part thereof "so", the Roman letters "soba" or a part thereof "so", and the like. Thus, the host CPU 61 can recognize the food item name "soba" corresponding to at least a part of the inputted voice signal.

The host CPU 61 selects one appropriate response content from plural response contents represented by the response data stored in the storage unit 62, in accordance with the result of recognition that is received. Moreover, the host CPU 61 supplies the voice signal synthesis unit 36 with response data representing the selected response content and supplies the conversion list storage unit 33 with a conversion list corresponding to the selected response content.

For example, the host CPU 61 supplies the voice signal synthesis unit 36 with response data representing a question "How many?". In this case, the first word to be spoken by the user in response to this question is expected to be one of plural responses such as "hitotu" (one), "hutatu" (two), and "mittu" (three). Thus, the host CPU 61 supplies the conversion list storage unit 33 of the semiconductor integrated circuit device 30 with a conversion list B (see FIG. 4) containing character data representing the plural responses such as "hitotu", "hutatu", and "mittu".

When the conversion list storage unit 33 stores the conversion list B, the standard pattern extraction unit 34 extracts, from the voice recognition database, a standard pattern representing the state of distribution of frequency components with respect to each of the phonemes "h•i", "h•u", "m•i" and the like included in the first syllables "hi", "hu", "mi" and the like of the words "hitotu", "hutatu", "mittu" and the like expressed by the character data contained in the conversion list B.

The voice signal synthesis unit 36 synthesizes a voice signal based on the response data supplied from the host CPU 61 and outputs the voice signal to the D/A converter 40. The D/A converter 40 converts the digital voice signal to an analog voice signal and outputs the analog voice signal to the voice output unit 50. Thus, the question "How many?" is outputted to the user from the voice output unit 50. The voice signal synthesis unit 36 also activates a response end signal and outputs the response end signal to the matching detection unit 35. Therefore, the matching detection unit 35 starts the voice recognition operation.

If the user says "Hitotu desu" in response to the question outputted from the voice output unit 50, the signal processing unit 31 generates a feature pattern representing the state of distribution of frequency components with respect to each of the phonemes "h•i•t•o•t•u . . . ".

The matching detection unit 35 compares the feature pattern of the first phoneme "h" of the first syllable generated by the signal processing unit 31 and the standard pattern of the first phoneme "h", "h", "m" or the like of the first syllable extracted from the voice recognition database, and thus detects the matching of the phoneme "h".

If the matching-detected phoneme is a consonant, the matching detection unit 35 further compares the feature pattern of the second phoneme "i" of the first syllable generated by the signal processing unit 31 and the standard pattern of the second phoneme "i", "u", "i" or the like of the first syllable extracted from the voice recognition database, and thus detects the matching of the phoneme "i".

The matching of the syllable "hi" is thus detected. The matching detection unit 35 outputs information that specifies the word "hitotu" having the matching-detected syllable "hi" as the first syllable thereof, as the result of recognition to the host CPU 61. Therefore, the host CPU 61 can recognize the word "hitotu" corresponding to at least a part of the inputted voice signal.

Then, the host CPU 61 supplies the voice signal synthesis unit 36 with response data representing a message "Insert OOO yen." The voice signal synthesis unit 36 synthesizes a voice signal based on the response data supplied from the host CPU 61 and outputs the voice signal to the D/A converter 40. The D/A converter 40 converts the digital voice signal to an analog voice signal and outputs the analog voice signal to the voice output unit 50. Thus, the message "Insert OOO yen" is outputted to the user from the voice output unit 50.

According to the first embodiment of the invention, since plural words or sentences contained in the conversion list have different first syllables from each other, voice recognition can be done simply by comparing a feature pattern generated from the first syllable of an inputted voice signal with a standard pattern corresponding to the first syllable of each word or sentence expressed by character data contained in the conversion list.

Next, a second embodiment of the invention will be described. In the first embodiment, plural words or sentences with the same first syllables cannot be discriminated. Thus, the second embodiment is made applicable even in the case where a conversion list containing plural words or sentences with the same first syllables is used. To this end, the range of syllables to be detected as matching by the matching detection unit 35 shown in FIG. 1 is expanded if plural words or sentences having the matching-detected syllable as the first syllable thereof exist in the conversion list. The other parts of the configuration are similar to the first embodiment.

As in the description of the first embodiment, the case where a voice recognition device according to the second embodiment is applied to a meal ticket vending machine in a cafeteria will be described. In the second embodiment, a food item menu including plural food item names with the same first syllable is displayed on the vending machine. It is assumed that the food item menu shows characters such as "soba", "udon", "kareh", "katudon" (pork cutlet on a bowl of rice) and the like.

In this case, the first word to be spoken by the user is expected to be one of the plural food item names displayed in the food item menu such as "soba", "udon", "kareh", and "katudon". Thus, the host CPU 61 supplies the conversion list storage unit 33 with a conversion list containing the plural food item names displayed in the food item menu.

When the conversion list is stored in the conversion list storage unit 33, the standard pattern extraction unit 34 extracts, from the voice recognition database, a standard pattern representing the state of distribution of frequency components with respect to each of the phonemes "s•o", "u" "k•a", "k•a" and the like included in the first syllables "so", "u", "ka", "ka" and the like of the food item names "soba", "udon", "kareh", "katudon" and the like contained in the conversion list.

For example, if the user looking at the displayed food item menu says "Katudon o kudasai" (I'd like katudon), the signal processing unit 31 generates a feature pattern representing the state of distribution of frequency components with respect to each of the phonemes "k•a•t•u•d•o•N . . . ".

The matching detection unit 35 compares the feature pattern of the first phoneme "k" of the first syllable generated by the signal processing unit 31 and the standard pattern of the first phoneme "s", "u", "k", "k" or the like of the first syllable extracted from the voice recognition database, and thus detects the matching of the phoneme "k".

The matching detection unit 35 further compares the feature pattern of the second phoneme "a" of the first syllable generated by the signal processing unit 31 and the standard pattern of the second phoneme "o", "a", "a" or the like of the first syllable extracted from the voice recognition database, and thus detects the matching of the phoneme "a".

The matching of the syllable "ka" is thus detected. However, since the conversion list contains the food item name "kareh" and the food item name "katudon", which is the corresponding word cannot be recognized. In such a case, the matching detection unit 35 expands the range of syllables to be detected as matching.

That is, the matching detection unit 35 outputs a signal requesting the extraction of a standard pattern corresponding to the second syllable of the food item name contained in the conversion list, to the standard pattern extraction unit 34. Thus, the standard pattern extraction unit 34 extracts, from the voice recognition database, a standard pattern representing the state of distribution of frequency components with respect to each of the phonemes "r•e" and "t•u" included in the second syllables "re" and "tu" of the food item names "kareh" and "katudon" contained the conversion list.

The matching detection unit 35 compares the feature pattern of the first phoneme "t" of the second syllable generated by the signal processing unit 31 and the standard patterns of the first phonemes "r" and "t" of the second syllables extracted from the voice recognition database, and thus detects the matching of the phoneme "t".

The matching detection unit 35 further compares the feature pattern of the second phoneme "u" of the second syllable generated by the signal processing unit 31 and the standard patterns of the second phonemes "e" and "u" of the second syllables extracted from the voice recognition database, and thus detects the matching of the phoneme "u".

The matching of the syllable "tu" is thus detected. The matching detection unit 35 outputs information that specifies the food item name "katudon" having the matching-detected first syllable "ka" and second syllable "tu", as the result of recognition to the host CPU 61. Thus, the host CPU 61 can recognize the food item name "katudon" corresponding to at least a part of the inputted voice signal.

If there are other food item names having the first syllable "ka" and the second syllable "tu", the matching detection unit 35 can further expand the range of syllables to be detected for matching. In this way, according to the second embodiment, a conversion list containing plural words or sentences with the same first syllable can be used.

In the foregoing embodiments, the case where the invention is applied to a vending machine is described. However, the invention is not limited to the embodiments and can be applied to general electronic apparatuses. Also, those skilled in the art can make various modifications within the technical scope of the invention.

What is claimed is:

1. A semiconductor integrated circuit device comprising:
   a signal processing unit extracts frequency components of an inputted voice signal, and generates a feature pattern representing a state of distribution of the frequency components of the voice signal;
   a voice recognition database storage unit which stores a plurality of voice recognition databases each including a standard pattern representing a state of distribution of frequency components of plural phonemes used in a predetermined language, each of the plurality of voice recognition databases having been generated based on voice signals of a different group of speakers, each different group of speakers having a different age and/or gender than other ones of the groups of speakers;
   a conversion list storage unit which stores a conversion list expressed by character data and including plural words or sentences to be conversion candidates, the plural words or candidates being expected responses to a question or message;
   a standard pattern extraction unit which extracts the standard pattern corresponding to the character data representing the first syllable of each word or sentence included in the conversion list, from the voice recognition database; and
   a matching detection unit which receives an input of age and/or gender of a user, and selects a corresponding one of the plurality of voice recognition databases based on the input, and which compares the feature pattern generated from the first syllable of the voice signal with the standard pattern extracted by the standard pattern extraction unit, thus detects the matching of the syllable, and outputs information specifying a word or sentence that has the matching-detected syllable as the first syllable thereof.

2. The semiconductor integrated circuit device according to claim 1, wherein the conversion list includes plural words or sentences having different first respective syllables from each other.

3. The semiconductor integrated circuit device according to claim 1, wherein if the conversion list includes plural words or sentences having the matching-detected syllable as the first syllables thereof, the matching detection unit expands a range of syllables to be detected for matching.

4. The semiconductor integrated circuit device according to claim 1, further comprising a voice signal synthesis unit which synthesizes an output voice signal based on response data,
   wherein the matching detection unit compares the feature pattern generated from the first syllable of the voice signal inputted within a predetermined period after a voice based on the output voice signal synthesized by the voice signal synthesis unit is outputted, with the standard pattern extracted from the voice recognition database.

5. The semiconductor integrated circuit device according to claim 4, wherein the conversion list is associated with the response data.

6. A voice recognition device comprising:
the semiconductor integrated circuit device according to claim 4; and
a control unit which selects one response content from plural response contents according to the result of voice recognition by the semiconductor integrated circuit device, supplies the voice signal synthesis unit with the response data representing the selected response content, and supplies the conversion list storage unit with the conversion list corresponding to the selected response content.

7. A voice recognition method comprising:
(a) storing a conversion list expressed by character data and including plural words or sentences to be conversion candidates, the plural words or candidates being expected responses to a question or message;
(b) extracting a standard pattern corresponding to the character data expressing the first syllable of each word or sentence included in the conversion list from a plurality of voice recognition databases each including a standard pattern indicating a state of distribution of frequency components of plural phonemes used in a predetermined language, each of the plurality of voice recognition databases having been generated based on voice signals of a different group of speakers, each different group of speakers having a different age and/or gender than other ones of the groups of speakers;
(c) receiving an input of age and/or gender of a user, selecting a corresponding one of the plurality of voice recognition databases based on the input, extracting frequency components of an inputted voice signal, and generating a feature pattern indicating a state of distribution of the frequency components of the voice signal; and
(d) comparing the feature pattern generated from the first syllable of the voice signal with the extracted standard pattern, thus detecting the matching of the syllable, and outputting information that specifies a word or sentence having the matching-detected syllable as the first syllable thereof.

8. A semiconductor integrated circuit device comprising:
a signal processing unit which divides an inputted voice signal into a plurality of frames, calculates a low order numeric value for each frame, connects the low order numeric values, and generates a feature pattern corresponding to each of the connected low order numeric values representing a state of distribution of frequency components of the voice signal;
a voice recognition database storage unit which stores a plurality of voice recognition databases each including a standard pattern representing a state of distribution of frequency components of plural phonemes used in a predetermined language, each of the plurality of voice recognition databases having been generated based on voice signals of a different group of speakers, each different group of speakers having a different age and/or gender than other ones of the groups of speakers;
a conversion list storage unit which stores a conversion list expressed by character data and including plural words or sentences to be conversion candidates, the plural words or candidates being expected responses to a question or message;
a standard pattern extraction unit which extracts the standard pattern corresponding to the character data representing the first syllable of each word or sentence included in the conversion list, from the voice recognition database; and
a matching detection unit which receives an input of age and/or gender of a user, and selects a corresponding one of the plurality of voice recognition databases based on the input, and which compares the feature pattern generated from the first syllable of the voice signal with the standard pattern extracted by the standard pattern extraction unit, thus detects the matching of the syllable, and outputs information specifying a word or sentence that has the matching-detected syllable as the first syllable thereof.

* * * * *